United States Patent
Rice et al.

(10) Patent No.: US 10,637,867 B2
(45) Date of Patent: Apr. 28, 2020

(54) SYSTEM FOR DYNAMIC ROLE-BASED EVALUATION OF ACCESS AND PERMISSIONS

(71) Applicant: Bank of America Corporation, Charlotte, NC (US)

(72) Inventors: Christopher Lamont Rice, Hunterville, NC (US); Amit Dixit, Gurugram (IN); Neetu Chadha, Dwarka (IN); Aditya Vyas, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 15/875,365

(22) Filed: Jan. 19, 2018

(65) Prior Publication Data

US 2019/0230088 A1  Jul. 25, 2019

(51) Int. Cl.
| | |
|---|---|
| H04L 29/06 | (2006.01) |
| G06F 21/62 | (2013.01) |
| G06F 21/60 | (2013.01) |
| G06F 16/21 | (2019.01) |
| G06F 16/28 | (2019.01) |

(52) U.S. Cl.
CPC ............ H04L 63/102 (2013.01); G06F 16/21 (2019.01); G06F 16/288 (2019.01); G06F 21/604 (2013.01); G06F 21/6218 (2013.01)

(58) Field of Classification Search
CPC ..... H04L 63/102; G06F 16/288; G06F 16/21; G06F 21/604; G06F 21/6218; G06F 21/62

See application file for complete search history.

(56) References Cited

U.S. PATENT DOCUMENTS

| | | | |
|---|---|---|---|
| 6,161,139 A | 12/2000 | Win et al. | |
| 6,985,955 B2 * | 1/2006 | Gullotta | G06Q 10/06 709/229 |
| 7,131,000 B2 | 10/2006 | Bradee | |
| 7,774,365 B2 | 8/2010 | Oxenstierna et al. | |
| 8,132,231 B2 * | 3/2012 | Amies | H04L 67/02 726/1 |
| 9,189,644 B2 | 11/2015 | Kling et al. | |

(Continued)

FOREIGN PATENT DOCUMENTS

WO   2013126052 A1   8/2013

*Primary Examiner* — Huan V Doan
(74) *Attorney, Agent, or Firm* — Michael A. Springs; Moore & Van Allen PLLC; Peter B. Stewart

(57) ABSTRACT

Embodiments of the present invention provide a system for dynamic role-based evaluation of access permissions. The system is configured to generate a database comprising a plurality of job roles and associated access permissions. A job role of a particular user is identified from the database by the system, and the job role is matched to a set of access permissions based on a comparison of the user's job role to the database. The user is authorized for the set of access permissions and generally does not authorize the user for any other access permissions. The system may compile a compliance database comprising the plurality of access permissions and compliance criteria associated with each access permission. When the system receives a user request for accessing an outlier access permission, the system determines whether the user meets the compliance criteria of that outlier access permission before authorizing the outlier access permission.

12 Claims, 6 Drawing Sheets

(56) References Cited

U.S. PATENT DOCUMENTS

| | | |
|---|---|---|
| 9,246,945 B2 * | 1/2016 | Chari ................. H04L 63/20 |
| 9,280,678 B2 | 3/2016 | Redberg |
| 9,418,236 B2 | 8/2016 | Cabrera et al. |
| 9,419,917 B2 | 8/2016 | Eaton et al. |
| 9,477,838 B2 | 10/2016 | Moloian et al. |
| 9,483,488 B2 | 11/2016 | Kling et al. |
| 9,495,380 B2 | 11/2016 | Kling et al. |
| 9,519,756 B2 | 12/2016 | Bitran et al. |
| 9,529,629 B2 | 12/2016 | Moloian et al. |
| 9,613,330 B2 | 4/2017 | McLaren et al. |
| 2014/0181965 A1 * | 6/2014 | Kling ............. G06F 21/6218 726/21 |
| 2014/0208399 A1 | 7/2014 | Ponzio, Jr. |
| 2014/0282825 A1 * | 9/2014 | Bitran ................ G06F 21/00 726/1 |
| 2014/0289846 A1 * | 9/2014 | Moloian ........... G06F 21/604 726/21 |
| 2015/0281239 A1 | 10/2015 | Brophy |
| 2017/0093871 A1 * | 3/2017 | Abuelsaad ......... H04L 63/104 |

\* cited by examiner

SYSTEM FOR DYNAMIC ROLE-BASED EVALUATION OF ACCESS AND PERMISSIONS

BACKGROUND

Maintaining large numbers of access permissions across an enterprise is a complex, resource-intensive undertaking. Dynamic role-based evaluation of access permissions, and the application of those role-based evaluations for access permission provisioning, reviews, compliance reporting, and auditing purposes can significantly reduce the complexity concerns, reduce processing requirements, and shorten the time it takes to accomplish such tasks.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamic role-based evaluation of access permissions. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve generating a database of a plurality of known job roles and associated access permissions. The system may then identify a job role of a user, wherein the job role of the user is one of the plurality of known job roles and match the job role of the user with a set of access permissions, based on a comparison of the job description of the user to the database of the plurality of job descriptions. In some embodiments, the system may then perform the steps of authorizing the user for the set of access permissions and not authorizing the user for any other access permissions.

In some embodiments, the system may be configured to compile a business language correlation database of known job roles and associated business language terms. The system may then receive, from a computing device of a specialist, a plain language job description for the user. The system can than compare the plain language job description for the user to the business language correlation database to identify the job role of the user.

The system may, in some embodiments, compare current authorized access permissions of the user to the set of access permissions associated with the job role of the user. The system can then identify an outlier access permission of the user that is not in the set of access permissions associated with the job role of the user and identify one or more other users that are associated with the job role of the user. The system may next identify an outlier ratio of a number of the one or more other users that are authorized for the outlier access permission of the user versus a total number of the one or more other users that are associated with the job role of the user. The system can then determine whether the outlier ratio is greater than a predetermined threshold ratio and either authorize the user for the outlier access permission in response to determining that the outlier ratio is greater than the predetermined threshold ratio, or not authorize the user for the outlier access permission in response to determining that the outlier ratio is not greater than the predetermined threshold ratio.

Additionally or alternatively, the system may identify differences between current authorized access permissions of the user and the set of access permissions associated with the job role of the user. The system may then compile a report on the identified differences between the current authorized access permissions of the user and the set of access permissions associated with the job of the user and transmit the compiled report to a computing device of a specialist.

Furthermore, the system may be configured to compile a compliance database comprising the plurality of access permissions and compliance criteria associated with each access permission of the plurality of access permissions. Subsequently, the system may receive a request from the user to access an outlier access permission that is not in the set of access permissions associated with the job role of the user. The system can identify a set of compliance criteria associated with the outlier access permission from the compliance database and determine whether compliance information associated with the user meets the compliance criteria associated with the outlier access permission. The system may then either authorize the user for the outlier access permission when the compliance information associated with the user does meet the compliance criteria associated with the outlier access permission, or reject the user for the outlier access permission when the compliance information associated with the user does not meet the compliance criteria associated with the outlier access permission.

In some embodiments, the system may be configured to provide a user interface on a computing device of a specialist with a display of a current compliance status associated with at least the user and adjustable compliance parameters associated with the compliance criteria. The system may then receive an adjustment to a first compliance parameter from the computing device of the specialist. In response to receiving the adjustment to the first compliance parameter, the system may determine a change to the compliance criteria associated with the set of access permissions associated with the user. Finally, the system may update the display of the current compliance status on the user interface of the computing device of the specialist with the determine change to the compliance criteria associated with the set of access permissions associated with the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
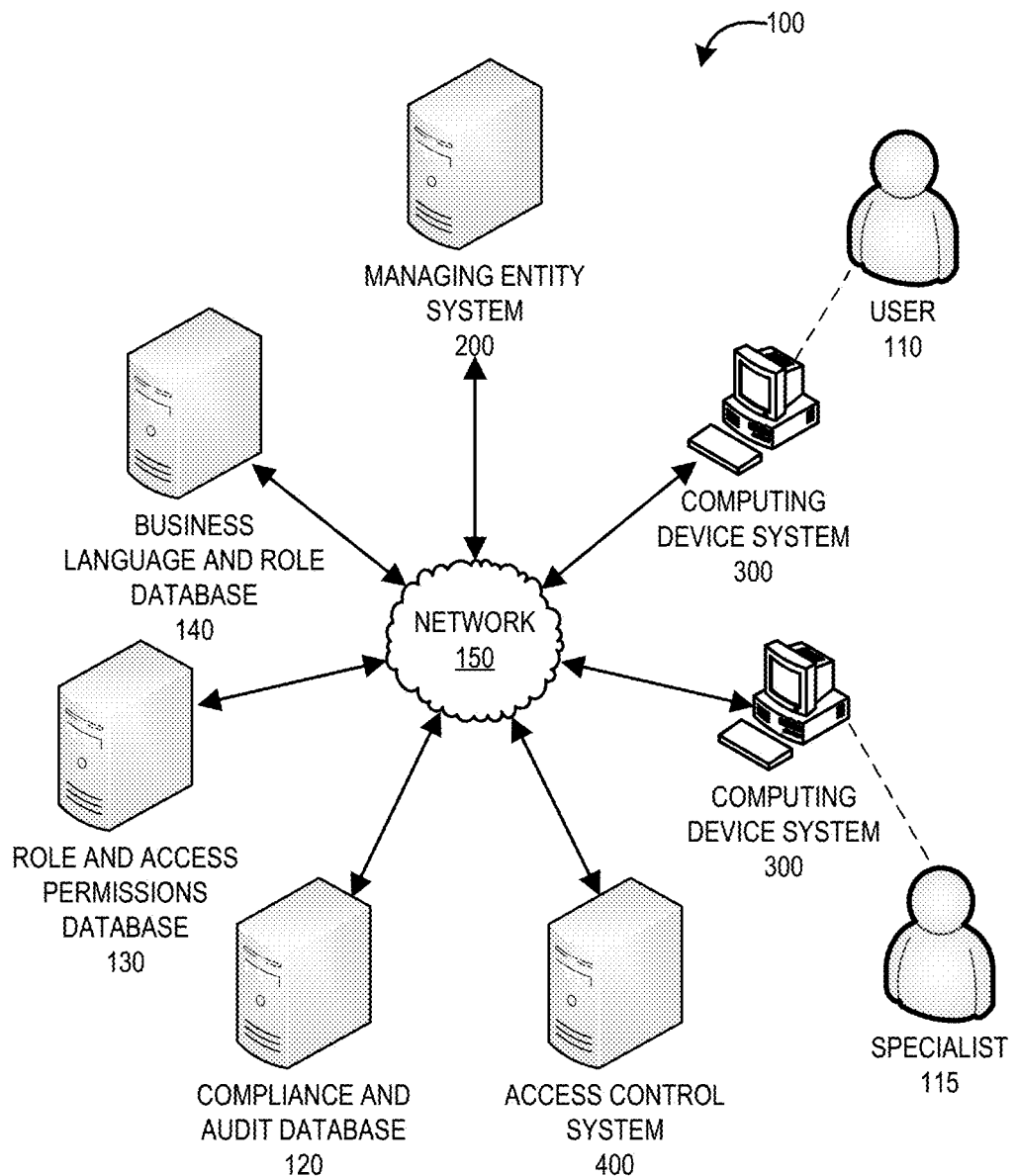
Figure 2:
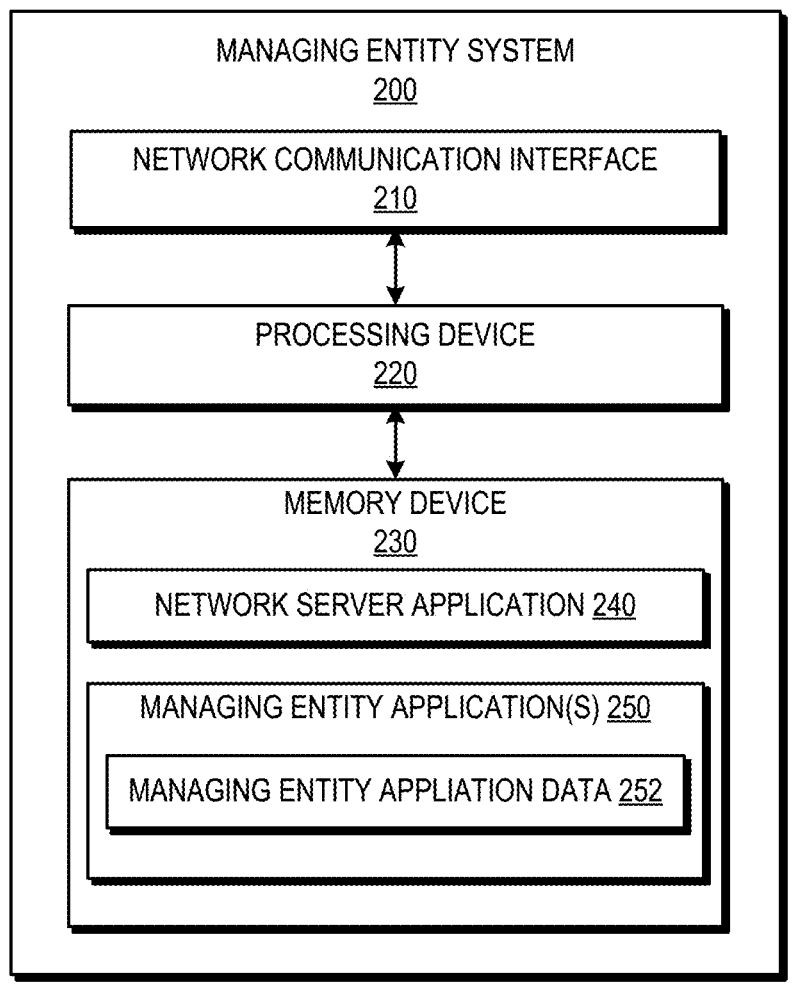
Figure 3:
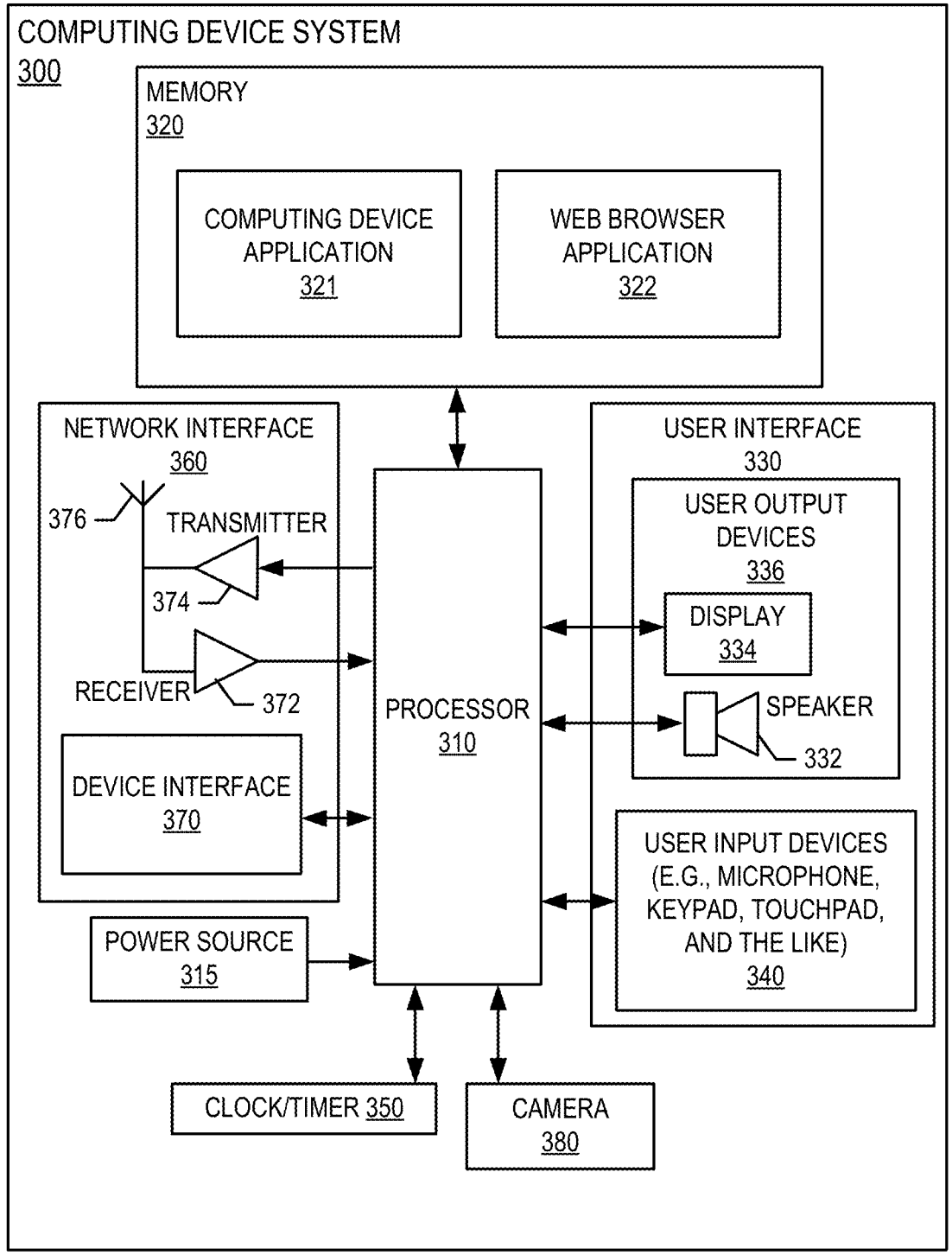
Figure 4:
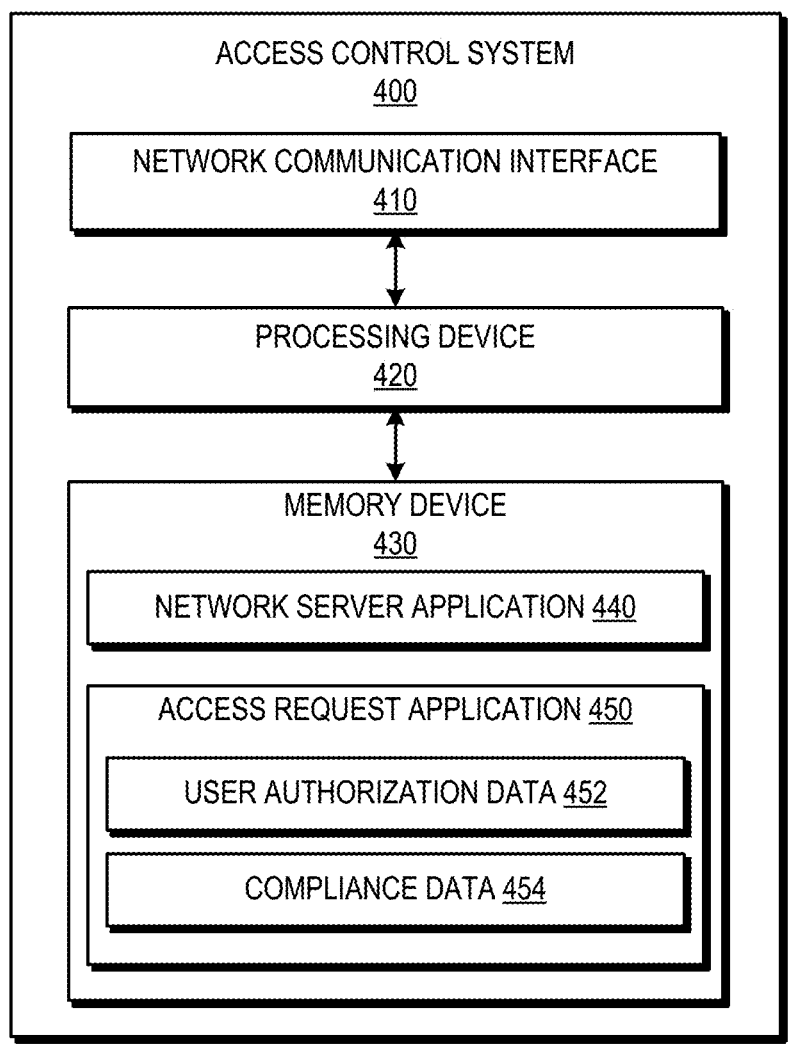
Figure 5:
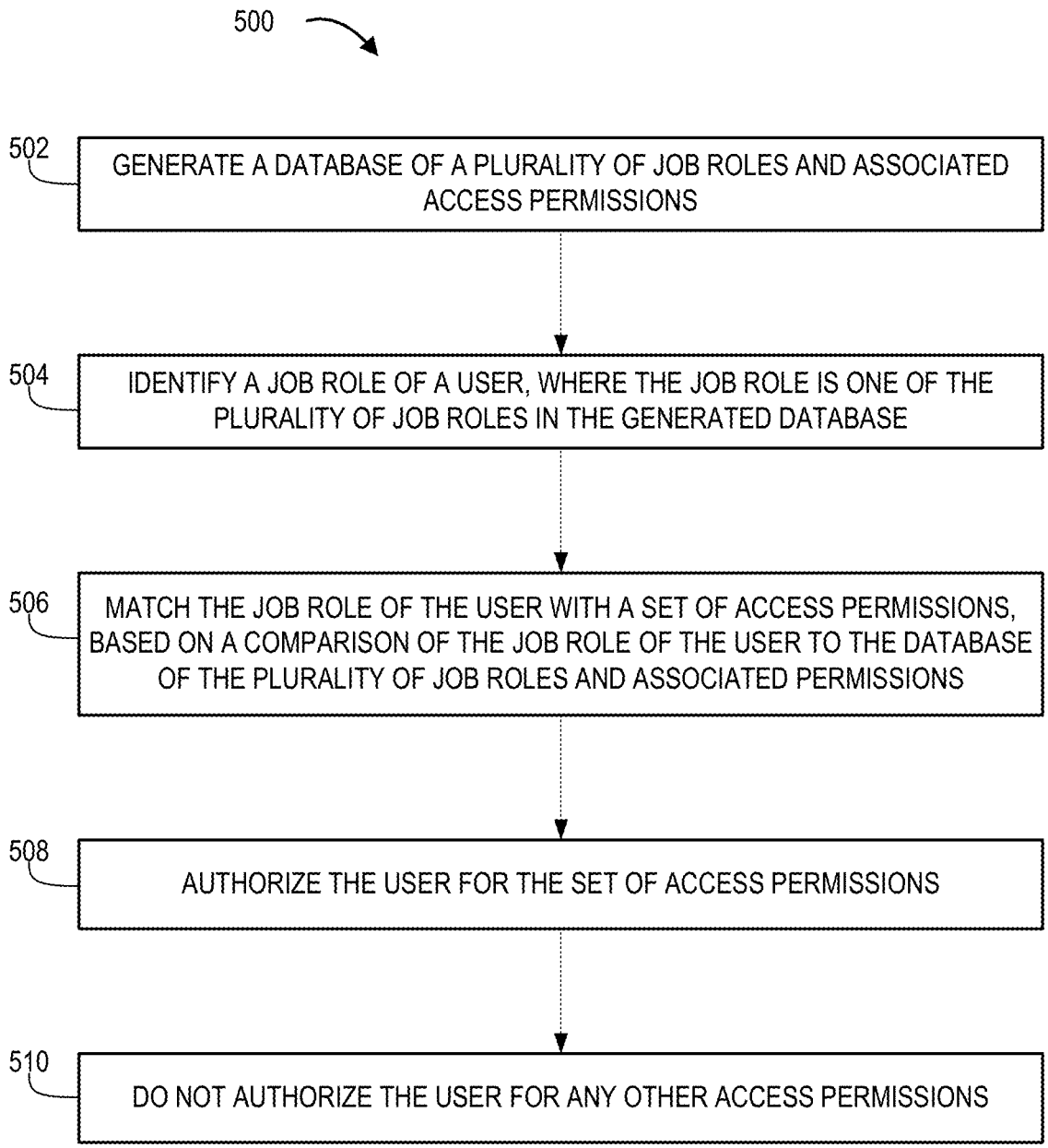
Figure 6:
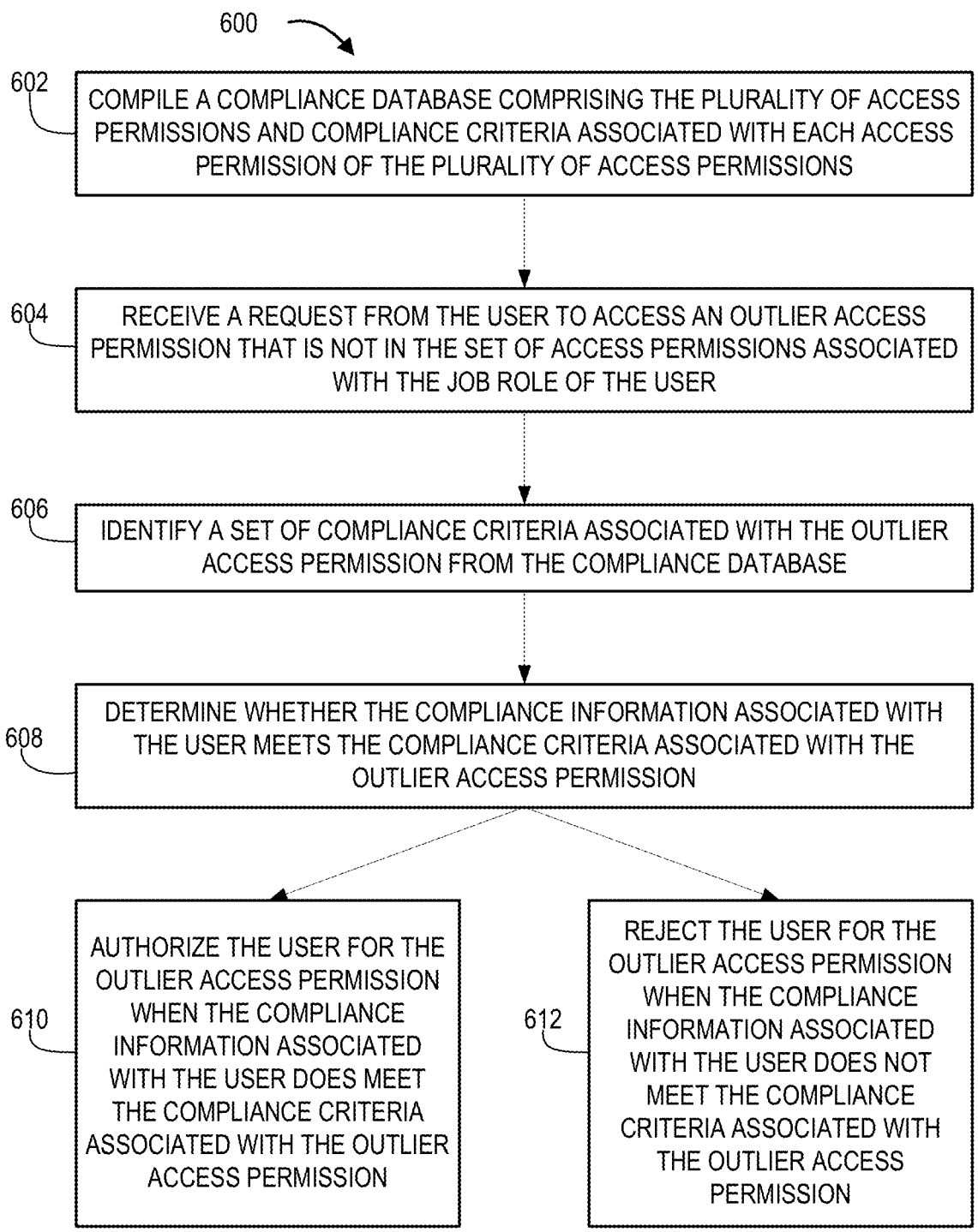

Having thus described embodiments of the invention in general terms, reference will now be made the accompanying drawings, wherein:

FIG. 1 provides a block diagram illustrating a system environment for providing a system and method for dynamic role-based evaluation of access permissions, in accordance with an embodiment of the invention;

FIG. 2 provides a block diagram illustrating managing entity system of FIG. 1, in accordance with an embodiment of the invention;

FIG. 3 provides a block diagram illustrating the computing device system 300 of FIG. 1, in accordance with an embodiment of the invention;

FIG. 4 provides a block diagram illustrating the access control system 400 of FIG. 1, in accordance with an embodiment of the invention;

FIG. 5 provides a flowchart illustrating a process for providing a system and method for dynamic role-based evaluation of access permissions, in accordance with an embodiment of the invention; and FIG. 6 provides a flowchart illustrating a process for dynamic role-based evaluation of access permissions, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for dynamic role-based evaluation of access permissions. Generally, the system leverages the commonalities among users with similar job roles (or other employment functions) to generate sets of access permissions (authorizations to view or utilize a business component like entry to a building, access to a database, access to a document, access to a workstation, and the like) that can be linked to respective job roles that tend to require or benefit from having those sets of access permissions.

FIG. 1 provides a block diagram illustrating a system environment 100 for dynamic role-based evaluation of access permissions, in accordance with an embodiment of the invention. As illustrated in FIG. 1, the environment 100 includes a managing entity system 200, one or more computing device systems 300, an access control system 400, a compliance and audit database 120, a role and access permissions database 130, and a business language and role database 140. One or more users 110 and/or specialists 115 may be included in the system environment 100.

In some embodiments, the user(s) 110 of the system environment 100 may be employees, workers, associates, or other individuals that are part of or employed by an entity associated with the managing entity system 200. The managing entity system 200 may be associated with a large number of individual devices, buildings, servers, databases, accounting, compliance, and other devices or systems that each user 110 must have authorized access permission to utilize. Each user 110 may be associated with a particular job title, job definition, business group, business enterprise, and the like, where other users with the same job title, job definition, and the like, tend to require or desire the same access permissions, due to the similarities in the actions and resources that these users undertake and utilize in the regular course of business.

As used herein, a "specialist" like the specialist 115 may be any manager, auditor, compliance employee, regulator, or any other individual with managerial or overview duties. In some embodiments, an access permission for a user 110 must be authorized by (or approved for authorization) by a specialist 115. In other embodiments, the specialist 115 may be an individual that is tasked with monitoring or managing compliance issues for access permissions of the user 110 and/or across the enterprise. The specialist 115 may also be an individual tasked with generating, manipulating, or drafting compliance reports, access permission reports, audit reports, and the like.

The managing entity system 200, the computing device systems 300, the access control system 400, the compliance and audit database 120, the role and access permissions database 130, and/or the business language and role database 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. The managing entity may be any entity with a large number of access permissions associated with individual devices, profiles, databases, servers, buildings, rooms, and the like. In some embodiments, the managing entity is a financial institution. In general, the managing entity system 200 is configured to communicate information or instructions with the computing device systems 300, the access control system 400, the compliance and audit database 120, the role and access permissions database 130, and/or the business language and role database 140 across the network 150.

For example, the managing entity system 200 may generate a database of a plurality of job roles and associated access permissions and store the database as the role and access permissions database 130. The managing entity system 200 may also be configured to generate a compliance database comprising the plurality of access permissions and compliance criteria associated with each access permission of the plurality of access permissions and store the database as the compliance and audit database 120. Additionally, the managing entity system 200 may be configured to identify a job role of the user 110, which in some embodiments involves comparing a plain language or written job description of the user to the business language and role database 140 to identify the job role of the user 110. The managing entity system 200 may also be configured to cause the access control system 400 to authorize or reject the user 110 for one or more access permissions and/or to request and verify additional authorization credentials to allow the user 110 to be authorized for an outlier access permission. Of course, the managing entity system 200 may be configured to perform (or instruct other systems to perform) one or more other process steps described herein. The managing entity system 200 is described in more detail with respect to FIG. 2.

Each computing device system 300 may by a system owned or controlled by the managing entity and/or a third party that specializes in providing a workstation, personal computer, tablet computer, server, virtual server, virtual workstation, or any other computing device with a user interface configured to display information and requests to a user 110 or specialist 115 and/or receive input from the user 110 or specialist 115. In general, each computing device system 300 is configured to communicate information or instructions with the managing entity system 200, the access control system 400, the compliance and audit database 120, the role and access permissions database 130, and/or the business language and role database 140 across the network 150.

For example, a computing device system 300 may receive a prompt from the managing entity system 200 to provide authentication credentials, which can be provided by the user 110 or the specialist 115 via a user interface. The computing device system 300 may also be configured to receive instructions to provide a user interface to the specialist 115, where the user interface displays a current compliance status associated with at least the user 110 and adjustable compliance parameters associated with certain compliance criteria. In such embodiments, the computing device system 300 may also receive input form the specialist 115 to adjust one of the adjustable compliance parameters, transmit that adjustment to the managing entity system 200 and/or the access control system 400, receive a determined change to compliance criteria resulting from the adjustment, and display that determined change to compliance criteria on the user interface of the computing device system 300. Of course, the computing device systems 300 may be configured to perform (or instruct other systems to perform) one or more other process steps described herein. An example computing device system 300 is described in more detail with respect to FIG. 3.

The access control system 400 may by a system owned or controlled by the managing entity and/or a third party that specializes in managing, authorizing, rejecting, and reporting the users, identities, workstations, and the like for each device, building, network, or system in the enterprise that requires some level of access permission. For example, the access control system 400 may include a database of all access permissions that the user 110 is authorized for. Therefore, when the user 110 requests a particular access permission (e.g., using a door badge to enter a floor of a building), the request is transmitted to the access control system 400 which, in turn, determines that the user 110 does have the appropriate access permission and returns an authorization signal to cause a door to the requested floor to open. Additionally, the managing entity system 200 or the specialist 115 (via a computing device system 300) may have the ability to adjust a set of access permissions associated with each user (or each job role).

In general, the access control system 400 is configured to communicate information or instructions with the managing entity system 200, the computing device systems 300, the compliance and audit database 120, the role and access permissions database 130, and/or the business language and role database 140 across the network 150. For example, the access and control system 400 may receive a request for confirmation as to whether the user 110 is authorized for an access permission from the managing entity system 200 or a computing device system 300. The access and control system 400 may also be configured to make the determination as to whether the user 110 is authorized for the access permission and transmit a confirmation notification or rejection notification to the managing entity system 200 and/or a computing device system 300. Furthermore, the access control system 400 may periodically and/or continuously monitor the role and access permissions database 130 to update internal database of which users (e.g., the user 110 and others) are authorized for which access permissions. Of course, the access control system 400 may be configured to perform (or instruct other systems to perform) one or more other process steps described herein. The access control system 400 is described in more detail with respect to FIG. 4.

The compliance and audit database 120 may comprise a network communication interface, a processing device, and one or more memory devices, where the processing devices are configured to perform certain actions with the memory devices and communicate these actions to the rest of the network 150 through the network communication interface. The compliance and audit database 120 may be configured to receive, store, and make available a plurality of compliance criteria, user information, access permission information, and comparisons between the compliance criteria, user information, and access permission information. As used herein, the term "compliance criteria" refers to requirements put in place by regulatory bodies, internal requirements put in place by the managing entity, and other legal or business requirement that must be met. In particular, the compliance criteria are associated with access permissions for each business component in an enterprise. For example, compliance criteria may cover how many users may have a certain access permission, which users are authorized for certain access permissions, which type of users (or which levels of clearance) are authorized for certain access permissions, geographical restrictions on which users are authorized for certain access permissions, and the like. As such, the compliance and audit database 120 may comprise a listing of each compliance requirement and an indication as to whether each access permission within the enterprise meets, exceeds, or falls short of each compliance requirement. The compliance and audit database 120 may be dynamically updated in real time to provide a current and up-to-date representation of the compliance status of the enterprise.

In some embodiments, the compliance and audit database 120 may include one or more testing, virtual, or trial databases where a specialist (e.g., the specialist 115) can manipulate one or more compliance requirement to understand the effects of that manipulation across one or more access permissions and/or across the enterprise. Furthermore, the compliance and audit database 120 may include a ledger or other data repository for maintaining information that can be used to convey the status of the compliance requirements and/or access permissions for auditing, review, analysis, or other synopsis purposes.

The role and access permissions database 130 may comprise a network communication interface, a processing device, and one or more memory devices, where the processing devices are configured to perform certain actions with the memory devices and communicate these actions to the rest of the network 150 through the network communication interface. The role and access permissions database 130 may be configured to receive, store, and make available a plurality of job roles and associated access permissions. As such, the managing entity of the managing entity system 200 and/or the access control system 400 may generate and maintain the role and access permissions database 130 that includes every access permission associated with the business, operation, or enterprise of the managing entity.

Generally, a single, individual access permission is an indication that a related user is authorized to access or utilize a component of the business enterprise. Example components of a business enterprise include, but are not limited to computers, workstations, profiles, servers, virtual workstations, virtual servers, databases, electronic data files, electronic documents, physical records, buildings, doors, rooms, accounts, parking garages, payment instruments, and the like. Furthermore, these components may also be defined or classified by authorization levels. For example, a user (e.g., an employee) may have a basic or low level access permission for an online database that allows the user to view and read documents in the online database. However, a specialist (e.g., a manager) may have a different, elevated or high level access permission for the same online database that allows the specialist to view, read, and write to the online database. To clarify, these example access permissions for the user and the specialist are two distinct access permissions.

As used herein, the term "job role" refers to a job title, job definition, job category (e.g., geographical region of employment, level of employment, or the like), job code, or any other word, phrase, code, or identifier that is shared among employees with some commonality. For example, every employee (e.g., the user 100) of an institution (e.g., the managing entity) may have an employee profile that includes a job title, job code, employment business group identifier, or the like that associates that employee with the tasks, responsibilities, resource requirements, and the like that are expected or necessary for the employee to perform its job successfully. Information about which enterprise components are needed to allow an employee to perform its duties can be directly linked to, or otherwise gleaned from, the job role of that employee.

For example, the system can automatically link an employee with the job role of human resources at Office 1 to the access permissions for building access at Office 1, floor access for all floors related to the enterprise at Office 1, a workstation located in Office 1, a general human resources server for the enterprise, and the like. In other embodiments, the role and access permissions database can receive instructions on which job roles and access permissions should be linked together from the managing entity system 200, the access control system 400, or a computing device system 300 associated with a specialist 115 with authority to set job role and access permissions links. In either environment (or in both environments), the role and access permissions database 130 maintains a link, connection, reference or other association between each individual job role and a set of individual access permissions associated with that job role. In this way, once a job role has been defined for a user (e.g., the user 110), the managing entity system 200 can compare that defined job role for the user to its associated set of access permissions that are stored in the role and access permissions database 130. This set of access permissions can then be transmitted to the access control system 400 to authorize the user for that set of access permissions.

The business language and role database 140 may comprise a network communication interface, a processing device, and one or more memory devices, where the processing devices are configured to perform certain actions with the memory devices and communicate these actions to the rest of the network 150 through the network communication interface. The business language and role database 140 may be configured to receive, store, and make available a plurality of job roles and plain Language terms and/or business language terms (e.g., words, phrases, acronyms, numerical values, numerical codes, or the like). The plain Language terms and/or business language terms associated with each individual business role in the business language and role database 140 may be derived from job descriptions or summaries of the role, as written by employees with that job role, managers overseeing that job role, human resource personnel overseeing that job role, or the like.

As such, the plain Language terms and/or business language terms can be added to and/or updated over time as new business role descriptions, business job summaries, and the like, are received. Each job role in the business language and role database 140 will have its own set of plain Language terms and/or business language terms that are linked to that job role. Additionally, each plain Language term and/or business language term may have a relevancy score or other correlation value between the term and its respective job role that is stored in the business language and role database 140 along with the general linkage between the term and respective job role. More complex database relationships can also be established for the business language and role database 140, including a linking of multiple plain language terms and/or business language terms to a particular job role, along with a relevancy or other correlation value.

The business language and role database 140 is configured to be accessible to, and analyzed by, a business language machine learning engine that is capable of identifying an output of one or more ideal job roles based on an input of a business description or summary that comprises plain Language terms and/or business language terms.

In some embodiments, the compliance and audit database 120, the role and access permissions database 130, and/or the business language and role database 140 may be configured to receive, store, and make available a definitions of one or more of the access permissions and/or reasoning or logic for why each access permission is included in a particular job role. For example, a definition drafted or generated by a manager or another specialist 115 is stored along with its respective access permission in a database. The definition of an access permission may comprise one or more plain language or business language descriptions of the access permission (e.g., explaining what the access permission is for, which business component(s) the access permission is associated with, why the access permission is needed, what compliance rules or regulations the access permission satisfies, and the like).

Furthermore, the reasoning or logic for why a particular access permission has been linked to a particular job role may be included and stored within a database for future analysis. For example, a manager or another specialist 115 may draft a reasoning for why a first access permission is approved for a particular job role. Again, the reasoning or logic may be provided and stored in plain language, business language, codes, or any other manner, such that a machine learning algorithm can analyze the terms and compare them to a new description of a job role to determine whether the first access permission should be added to the job role. In some embodiments, the system may automatically store a logic for why a particular access permission must be included or cannot be included in a particular job role based on compliance criteria, business rules, or the like.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240 and one or more managing entity applications 250 that include managing entity application data 252 and other computer-executable instructions or other data. The computer-executable program code of the network server application 240 and the one or more managing entity applications 250 may instruct the processing device 220 to perform certain logic, data-processing, and data-storing functions of the managing entity system 200 described herein, as well as communication functions of the managing entity system 200.

The managing entity applications 250 may comprise any application, software, signaling system, or the like that enable the managing entity system 200 to perform one or more of the process steps described herein, including some or all of the steps described with respect to FIG. 5 and FIG. 6. For example, a managing entity application 250 may be a database compilation application configured to compile the compliance and audit database 120, the role and access permissions database 130, and/or the business language and role database 140. In such embodiments, the managing entity application data 252 may comprise job roles of one or more users, associated access permissions, compliance criteria, plain language terms and/or phrases, business terms and/or phrases, correlation data, and the like.

In some embodiments, a managing entity application 250 may comprise an authorization application that is configured to determine whether a user (e.g., the user 110) is authorized for a particular access permission and/or to update the access control system 400 or a separate database with the authorization information.

The network server application 240 and the one or more managing entity applications 250 are configured to invoke or use the managing entity application data 252 and data from networked databases when communicating through the network communication interface 210 with the computing device systems 300, the access control system 400, the compliance and audit database 120, the role and access permissions database 130, and/or the business language and role database 140.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the computing device systems 300, the access control system 400, the compliance and audit database 120, the role and access permissions database 130, the business language and role database 140, and the like. The processing device 220 is configured to use the network communication interface 210 to transmit and/or receive data and/or commands to and/or from the other devices connected to the network 150.

FIG. 3 provides a block diagram illustrating a computing device system 300 of FIG. 1 in more detail, in accordance with embodiments of the invention. In one embodiment of the invention, the computing device system 300 is a workstation, personal computer, laptop computer, virtual server, virtual workstation, and the like. Other types of computing device systems 300 may include portable or mobile devices such as portable digital assistants (PDAs), pagers, mobile televisions, gaming devices, laptop computers, cameras, video recorders, audio/video player, radio, GPS devices, or any combination of the aforementioned.

Some embodiments of the computing device system 300 include a processor 310 communicably coupled to such devices as a memory 320, user output devices 336, user input devices 340, a network interface 360, a power source 315, a clock or other timer 350, and a camera 380. The processor 310, and other processors described herein, generally include circuitry for implementing communication and/or logic functions of the computing device system 300. For example, the processor 310 may include a digital signal processor device, a microprocessor device, and various analog to digital converters, digital to analog converters, and/or other support circuits. Control and signal processing functions of the computing device system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the computing device system 300 to transmit and receive web content, such as, for example, location-based content and/or other web page content, according to a Wireless Application Protocol (WAP), Hypertext Transfer Protocol (HTTP), and/or or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. In this regard, the computing device system 300 may be configured to operate with one or more air interface standards, communication protocols, modulation types, and access types. By way of illustration, the computing device system 300 may be configured to operate in accordance with any of a number of first, second, third, and/or fourth-generation communication protocols and/or the like. For example, the computing device system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The computing device system 300 may also be configured to operate in accordance with non-cellular communication mechanisms, such as via a wireless local area network (WLAN) or other communication/data networks.

As described above, the computing device system 300 has a user interface 330 that is, like other user interfaces described herein, made up of user output devices 336 and/or user input devices 340. The user output devices 336 include a display 334 (e.g., a liquid crystal display or the like) and a speaker 332 or other audio device, which are operatively coupled to the processor 310.

The user input devices 340, which allow the computing device system 300 to receive data from a user such as the user 110, may include any of a number of devices allowing the computing device system 300 to receive data from the user 110, such as a keypad, keyboard, touch-screen, touchpad, microphone, mouse, joystick, other pointer device, button, soft key, and/or other input device(s). The user interface 330 may also include a camera 380, such as a digital camera.

The computing device system 300 further includes a power source 315, such as a battery, for powering various circuits and other devices that are used to operate the computing device system 300. Embodiments of the computing device system 300 may also include a clock or other timer 350 configured to determine and, in some cases, communicate actual or relative time to the processor 310 or one or more other devices.

The computing device system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the computing device system 300 and/or one or more of the process/method steps described herein. For example, the memory 320 may include such applications as a conventional web browser application 322 and/or a computing device application 321 (or any other application provided by the managing entity system 300). These applications also typically instructions to a graphical user interface (GUI) on the display 334 that allows the user 110 to interact with the computing device system 300, the managing entity system 300, and/or other devices or systems.

The computing device application 321 may be any application, software, signaling system, or the like that enables the computing device to receive input from an operator (e.g., the user 110 or the specialist 115), transmit the user input to one or more systems of the network 150, receive signals or other instructions from the other systems of the network 150, and cause the components of the computing device system 300 (e.g., the user output devices 336, the processor 310, the network interface 360, the clock/timer 350, and/or the camera 380) to perform certain action steps, as described herein. For example, a computing device application 321 may comprise a compliance application configured to cause the user interface 330 to display a current compliance status associated with at least a user and adjustable compliance parameters associated with a particular compliance criteria. In such embodiments, the computing device compliance application may be configured to receive user inputs, via the user input devices 336, for adjusting a compliance parameter, making a determination about changes to the compliance parameter (or transmitting the adjustment to a separate system and receiving the determination about the changes to the compliance parameter from that separate system), and updating the display 334 to show the changes to the compliance parameter.

The memory 320 can also store any of a number of pieces of information, and data, used by the computing device system 300 and the applications and devices that make up the computing device system 300 or are in communication with the computing device system 300 to implement the functions of the computing device system 300 and/or the other systems described herein.

FIG. 4 provides a block diagram illustrating the access control system 400, in greater detail, in accordance with embodiments of the invention. The access control system 400 may generally be a system configured to receive requests for an access permission, compare the received request to a set of authorized access permissions for the user, determine whether the user is authorized for the requested access permission, and either effectuating or preventing the requested access permission for the user. As illustrated in FIG. 4, in one embodiment of the invention, the access control system 400 includes one or more processing devices 420 operatively coupled to a network communication interface 410 and a memory device 430. In certain embodiments, the access control system 400 is operated by a first entity, such as a financial institution, while in other embodiments, the access control system 400 is operated by an entity other than a financial institution.

It should be understood that the memory device 430 may include one or more databases or other data structures/repositories. The memory device 430 also includes computer-executable program code that instructs the processing device 420 to operate the network communication interface 410 to perform certain communication functions of the access control system 400 described herein. For example, in one embodiment of the access control system 400, the memory device 430 includes, but is not limited to, a network server application 440, an access request application 450 which includes user authorization data 452 and compliance data 454. The computer-executable program code of the network server application 440 and/or the access request application 450 may instruct the processing device 420 to perform certain logic, data-processing, and data-storing functions of the access control system 400 described herein, as well as communication functions of the access control system 400.

As noted above, the access request application 450 may include user authorization data 452 and compliance data 454. The user authorization data 452 may comprise a set of access permissions that each user in the enterprise is authorized for. In some embodiments, this user authorization data 452 may include the entirety of a set of access permissions associated with a job role of each individual user. In such embodiments, one or more outlier access permissions may be included as well, depending on whether another system determines that each outlier access permission should be included for an individual user. The compliance data 454 may include compliance requirements, compliance parameters, and other data associated with regulations, laws, internal business decisions, and the like.

The network server application 440 and the access request application 450 are configured to invoke or use the user authorization data 452, the compliance data 454, and the like when communicating through the network communication interface 410 with the managing entity system 200, the one or more computing device system 300, the compliance and audit database 120, the role and access permissions database 130, the business language and role database 140, and the like. For example, the access control system 400 may be configured to receive an access request for a business component of entry to a particular building from the user 110. The access control system 400 may cause the access request application 450 to compare the user authorization data 452 and the compliance data 454 with the access request from the user 110 to determine whether the user 110 is authorized for the appropriate access permission associated with the particular business component of entry to the particular building. If the access control system 400 determines that the user 110 is authorized for the access permission, then the access control system 400 can unlock, clear, or otherwise permit the user 110 to gain entry to the particular building. However, if the access control system 400 determines that the user 110 is not authorized for the access permission, then the access control system 400 may either take no action or further restrict the access of the user 110. In some embodiments, the access control system 400 may require additional input from the user 110 of supplemental authorization credentials, require input from the specialist 115 of managerial or executive approval for the access of the user 110, or the like.

Referring now to FIG. 5, a flowchart is provided to illustrate one embodiment of a process 500 for dynamic role-based evaluation of access permissions, in accordance with embodiments of the invention. In some embodiments, the process 500 may include block 502, where the system generates a database of a plurality of job roles and associated access permissions. This database with the associated job roles and access permissions may be the role and access permissions database 130 referenced in FIG. 1.

As noted above, a job role refers to a job title, job definition, job category (e.g., geographical region of employment, level of employment, or the like), job code, or any other word, phrase, code, or identifier that is shared among employees with some commonality. For example, every employee (e.g., the user 100) of an institution (e.g., the managing entity) may have an employee profile that includes a job title, job code, employment business group identifier, or the like that associates that employee with the tasks, responsibilities, resource requirements, and the like that are expected or necessary for the employee to perform its job successfully. Information about which enterprise components are needed to allow an employee to perform its duties can be directly linked to, or otherwise gleaned from, the job role of that employee.

In some embodiments, the system may be configured to receive definitions of job roles, plain language descriptions of job roles, business language descriptions of job roles, and the like, and store these definitions or descriptions in the database as additional information regarding each job role. These definitions and descriptions can later be used by the system to compare newly identified access permissions (or outlier access permissions) to known job roles to determine whether the newly identified access permissions match the job role based on the definitions and descriptions of that job role (e.g., using machine learning and/or language processing algorithms). The job roles may also be defined based on compliance requirements, where each job role is designed to comply with a particular set of compliance criteria (e.g., government rules or regulations and/or business rules).

Likewise, as noted above, a single, individual access permission is an indication that a related user is authorized to access or utilize a component of the business enterprise. Example components of a business enterprise include, but are not limited to computers, workstations, profiles, servers, virtual workstations, virtual servers, databases, electronic data files, electronic documents, physical records, buildings, doors, rooms, accounts, parking garages, payment instruments, and the like. Furthermore, these components may also be defined or classified by authorization levels. For example, a user (e.g., an employee) may have a basic or low level access permission for an online database that allows the user to view and read documents in the online database. However, a specialist (e.g., a manager) may have a different, elevated or high level access permission for the same online database that allows the specialist to view, read, and write to the online database. To clarify, these example access permissions for the user and the specialist are two distinct access permissions, and would be recorded independently in the role and access permissions database 130.

Each individual access permission may be linked or otherwise stored in the database in combination with one or more definitions or descriptions of the access permission. For example, a definition, plan language descriptions, and/or business language descriptions of a particular access permission may be generated by a user 110, a specialist 115, or another manager (e.g., as the particular access permission comes online, as a new use for the access permission is identified, through a review or auditing process, or the like).

Additionally, a reasoning or logic for why a particular access permission is included for a particular job role may be drafted and recorded or automatically determined and recorded in the database. For example, the system may automatically determine that a first access permission must be included in a first job role based on a legal requirement identified in compliance criteria. This requirement may be stored in the database and related to the linkage between the first access permission and the first job role such that any subsequent review of the linkage, as stored in the database, will include an indication of the compliance requirement. Similarly, the system may determine from a legal requirement identified in compliance criteria that the first access permission can never be linked to a second job role. This negative linkage between the first access permission and the second job role may also be stored in the database. In this way, the system will be able to provide the reasoning or logic for why the first access parameter cannot be included in the second job role (e.g., in response to receiving for a request or inquiry into whether the first access parameter can be added to the second job role by a manager).

Additionally or alternatively, the system may store plain language or business language descriptions of each access parameter in the database. The database and/or system may be configured to store the descriptions of each access parameter such that the descriptions can be analyzed by a machine learning and/or language processing engine to identify whether each access parameter is appropriate, required, or cannot be included in a particular job role. As such, when a new job role is defined, the system can compare the definition of the new job role to the definitions and/or descriptions of a plurality of known access permissions to determine a set of access permissions that should be included in or otherwise associated with the new job role. The comparison may be conducted automatically using machine learning and/or language processing engines or algorithms that significantly reduce the amount of time and human errors that are prone to manual comparisons. As each access parameter is compared to the new job role, a logic or reasoning for including or not including the access parameter in the job role can be identified and recorded in the database for future reporting, review analysis, audit trail purposes, and the like. The database can be updated over time (e.g., periodically or in real time) by the system to maintain an accurate inventory of which access permissions should be tied to which individual job roles, as well as to define the logic or reasoning for why certain access permissions are or are not tied to each individual job role.

In some embodiments, the process 500 includes block 504, where the system identifies a job role of a user, where the job role is one of the plurality of job roles in the generated database. Again, the job role of the particular user may be a job title, a job description, a job code, a general authentication level (e.g., manager, executive, first tier, second tier, and the like), or any identifier that links the user to a particular category or grouping of users with similar or identical employment requirements and therefore require similar or identical access permissions to accomplish those employment requirements. As such, the system may access an employee database to match a known user to the related job role of that user. In some embodiments, the user may be associated with more than one job role. For example, the user may be associated with a first job role that is associated with the business group of that user, as well as a second job role that is associated with managerial or executive duties.

Identifying the job role of the user may, in some embodiments, comprise an additional set of steps to utilize business language correlation, machine learning, and other technical functions to identify or define a job role for the user when the job role of the user is not already known or stored within the system. For example, the system may compile a business language correlation database of known job roles and associated business language terms. This business language correlation database may be the business language and role database 140 referenced in FIG. 1. As such, the business language correlation database may be configured to receive, store, and make available a plurality of job roles and plain language terms and/or business language terms (e.g., words, phrases, acronyms, numerical values, numerical codes, or the like). Relevancy scores and other correlating values can also be stored in the business language correlation database to provide a more in-depth linkage between each term and its respective job roles.

The system may then receive a plain language job description for the user, which may have been transmitted from a computing device of a specialist (e.g., a manager of the user, a human resources system associated with the user, or the like). Again, the plain language job description for the user may be comprised of a plurality of plain language terms and/or business language terms that are already stored in the business language and role database.

Next, the system may compare the plain language job description for the user to the business language correlation database to perform the step of identifying the job role of the user. Comparing the plain language job description for the user to the business language correlation database may comprise causing or instructing a machine learning algorithm system to perform a complex machine learning analysis of the business language correlation database to identify one or more ideal job roles for the user.

Additionally, in some embodiments, the process 500 includes block 506, where the system matches the job role of the user with a set of access permissions, based on a comparison of the job role of the user to the database of the plurality of job roles. As each job of the plurality of job roles stored in the database (e.g., the role and access permissions database 130) is associated with and linked to its own set of access permissions, the system can easily match any known job role to its associated set of access permissions. In embodiments where the user is associated with a plurality of job roles, the system can identify the plurality of sets of access permissions associated with those job roles and combine the identified plurality of sets of access permissions into a single combined set of access permissions that are to be associated with the user.

As noted above, the set of access permissions associated with each job role are the access permissions that are known to be (or expected to be) common among all individual users that have the same job role. For example, employees working in the same location with the same job title and level of clearance can be expected to have the same access permissions for every business component. Because these similar employees require the same access permissions to business components like building access, workstations, databases, documents, and the like, the system is simplifying the access permission review and/or provisioning process by establishing the role and access permissions database 130 and identifying which access permissions are appropriate for a particular user based on their known or determined job role.

Therefore, once the system has identified which access permissions are appropriate, the process 500 may proceed to block 508, where the system authorizes the user for the set of access permissions that are related to or matched with the job role of the user. Authorizing the user for an access permission may involve updating the access control system 400 to grant the access permission for the user (or an identifier associated with the user). Once the access control system 400 has been updated to store the authorized access permission of the user, a subsequent inquiry to the access control system 400 as to whether the user has the required access permission to access or utilize the related business component will return a confirmation notification. For example, if access to a database titled "database1" is one of the access permissions that are authorized for the user, and the user attempts or requests access database1, the system will receive the user's access request, transmit the access request to the access control system 400, and receive a confirmation notification from the access control system 400. Once the confirmation notification has been received, the system will grant the user access to database1.

Finally, in some embodiments, the process 500 includes block 510, where the system does not authorize the user for any other access permissions. Not authorizing the user for any other access permissions may comprise rejecting or otherwise restricting every access permission of the enterprise that is not in the authorized set of access permissions. This may include removing one or more access permissions that the user was previously authorized for, to limit the total access permissions authorized to the user to those in the set of access permissions related to or matched with the job role of the user. In other embodiments, not authorizing the user for any other access permission comprises refraining from authorizing the user for any other access permissions of the business entity, but not actively removing previously or currently held access permissions of the user.

In some embodiments, one or more of the access permissions that the user is not authorized for comprise an access permission that can still be authorized for the user, given that certain additional authorization credentials are received. For example, an access permission for entry to a building outside of the user's known territory may be restricted to the user unless and until approval is received from a specialist (e.g., a manager). In another example, the user may have a first access permission associated with viewing and reading data in a particular database, but not have a second access permission associated with writing to that particular database. This second access permission may be granted to the user upon approval from a manager of the user. In some embodiments, these authorizations for access permissions that fall outside of the set of access permissions associated with the job role of the user may be time-based, number-based, or frequency-based in nature. For example, the second access permission (i.e., the writing access permission) for the particular database may be granted to the user for a period of several minutes, an hour, a day, a week, or the like. Additionally or alternatively, the second access permission for the particular database may be granted to allow the user to make a number of writing edits to the particular database.

In some embodiments, the system may generate a report, review, summary, or other analysis of the access permissions associated with the user and/or other users, and provide the report to a specialist like a manager, human resources department, executive, auditor, or the like. As such, the system may identify differences between current authorized access permissions of the user and the set of access permissions associated with the job role of the user. For example, the system may identify one or more outlier access permissions of the user, or access permissions that are currently assigned to the user but are not within the set of access parameters associated with the job role of the user.

These reports may include one or more of the definitions, descriptions (e.g., plain language descriptions, business language descriptions, and the like), compliance requirements, and the like for each access permission and/or job role associated with a particular user. Additionally or alternatively, the reasoning and/or logic for why each access permission is linked to one or more job role of the user can be included in the reports. Similarly, information about why one or more access permissions cannot be included in a job role of a user may be included in the report or generated in a new report upon an information request by the manager or specialist. From this information, the manager or specialist will be able to understand why particular access permissions have been linked to a job role of the user, what the purposes of each of those access permissions are, why particular access permissions cannot be approved for the user (or job role), and the like. This is especially helpful for enterprises where the number and complexity of access permissions is so great that managers cannot efficiently maintain up-to-date understandings of what access permissions are available and which users should have which access permissions.

Next, the system may compile a report on the differences between the current authorized access permissions of the user and the set of access permissions associated with the job of the user. The report can be a table, map, chart, database, rundown, or any other reporting document or tool that will allow a specialist to understand what the outlier access permissions are, why they were permissioned to begin with, whether the outlier access permissions should be added to the set of access permissions associated with the job role of the user, whether the outlier access permissions should be turned off for the user, and the like.

The system can then transmit the compiled report to a computing device of the specialist for their review, analysis, and/or additional input or instructions. The additional input or instructions may be to add one or more outlier access permissions to the set of access permissions associated with the job role of the user, to stop authorizing the user for one or more outlier access permissions, and the like.

While the user may generally be authorized for the set of access permissions associated with the job role of the user, the user may require one or more additional access permissions that fall outside of that set of access permissions. These "outlier access permissions" can still be provisioned to the user, as long as the system can determine that an outlier access permission is an access permission that is commonly authorized for other users with the same job role as the current user. To make the determination as to whether the user can be authorized for an outlier access permission, the system may perform the following steps.

First, the system may receive a request from the user for an outlier access permission, or the system may automatically identify the outlier access permission. Again, the outlier access permission is an access permission that is not in the set of access permissions associated with the job role of the user. The request may be made ahead of time (e.g., a request for building access prior to a visit to that building) or may be made as the user is attempting to view or utilize the business component associated with the outlier access permission (e.g., a request to view data in a database that is currently restricted to the user).

The system can then identify one or more users that are associated with the job role of the user. These one or more other users can be identified through a reverse comparison of a database comprising known job roles and the users in the enterprise that are associated with each job role. Commonly, these one or more users that are associated with the job role of the user are individuals at the same employment level as the user, with the same or similar work experience as the user, located at the same or similar geographical locations as the user, in the same business group as the user, having the same or similar job titles as the user, and the like. As such, and for the same reason that determining access permissions based on job roles, these closely related individuals tend to have similar or identical business responsibilities that require similar or identical access requirements. However, as there may be a large number of access permissions that managers and the enterprise as a whole need to manage, it may be difficult to maintain an accurate set of access permissions for each job role. Therefore, the system can identify these additional users with similar backgrounds and business requirements to determine whether any outlier access permissions should be granted to the user.

To this end, the system may identify an "outlier ratio" of a number of the one or more other users that are already authorized for the outlier access permission of the user versus a total number of the one or more other users that are associated with the job role of the user. For example, if there are five additional users associated with an outlier access permission of the user (e.g., an access permission for writing to a particular database), and four of these additional users are already authorized for the outlier access permission, then the outlier ratio for this outlier access permission is four fifths (4/5), or eighty (80) percent.

The system then determines whether the outlier ratio is greater than a predetermined threshold ratio. The predetermined threshold ratio may be different for each access permission, each type of business component associated with the access permissions (e.g., a database storing client information may have a very high predetermined threshold ratio while a read-only database with published marketing images may have a low predetermined threshold ratio), and the like. In some embodiments, an outlier access permission may require manual approval from a manager or executive, and therefore could not be approved through this process.

When the system determines that the outlier ratio is greater than the predetermined threshold ratio, the system will authorize the user for the outlier access permission. Because the system has determined a strong likelihood that the access permission is integral to the employment requirements of the user, based on the similar access permissions of related users, the system can automatically authorize the user without requiring manual intervention. In some embodiments, the system can add this outlier access permission to the set of access permissions associated with the job role of the user and/or authorize every other individual with the same job role for the outlier access permission.

For outlier access permission requests that are made while the user is attempting to view or utilize the associated business component, this process can be conducted automatically and in real time (or in near-real time) to authorize the outlier access permission as quickly as possible and prevent or mitigate any business delays associated with determining whether the user should have the outlier access permission. This automated process significantly reduces the time it takes to authorize a user for an outlier access permission, versus the conventional techniques of requesting manual approval from a manager or other administrator.

Alternatively, when the system determines that the outlier ratio is not greater than the predetermined threshold ratio, the system will reject or otherwise not authorize the user for the outlier access permission. Here, the system has determined that there is not enough of a correlation between the job role of the user and the outlier access permission to automatically authorize the user for the outlier access permission. In such embodiments, the system may request manual approval from a specialist or manager before authorizing the user for the outlier access permission.

Referring now to FIG. 6, a flowchart is provided to illustrate one embodiment of a process 600 for dynamic role-based evaluation of access permissions, in accordance with embodiments of the invention. In some embodiments, the process 600 may include block 602, where the system compiles a compliance database comprising the plurality of access permissions and compliance criteria associated with each access permission of the plurality of access permissions. In some embodiments, this compliance database may be the compliance and audit database 120 referenced with respect to FIG. 1. As such, the compliance database may comprise a plurality of compliance criteria, or compliance requirements, and indications as to whether each access permission within the enterprise meets, exceeds, or falls short of each of the plurality of compliance criteria.

In some embodiments, the process 600 includes block 604, where the system receives a request from the user to access an outlier access permission that is not in the set of access permissions associated with the job role of the user. Again, an outlier access permission is an access permission that the user does not currently have authorization for, and that lies outside of the set of access permissions associated with the job role of the user. The request for access to the outlier access permission may be made ahead of time (e.g., a request for entry to a building prior to a visit) or as the user is attempting to access or utilize the related business component (e.g., as a user attempts to open a restricted document).

Additionally, in some embodiments, the process 600 includes block 606, where the system identifies a set of compliance criteria associated with the outlier access permission from the compliance database. Once the system has identified the outlier access permission, the system can compare that outlier access permission to the compliance database (e.g., the compliance and audit database 120) to identify one or more compliance criteria (e.g., compliance requirements) that are related to that outlier access permission. These one or more compliance criteria that are related to the outlier access permission can then be bundled and referenced as a single set of compliance criteria associated with the outlier access permission.

The process 600 may also include block 608, where the system determines whether the compliance information associated with the user meets the compliance criteria associated with the outlier access permission. As the compliance criteria must be met before the user can be authorized for the outlier access permission, the system must determine whether the user has the requisite compliance criteria before automatically authorizing the user for the outlier access permission. Therefore, the system may compare the set of compliance criteria to a database of information associated with the user (e.g., a human resources file of the user, a compliance database, a user database, and the like).

When the compliance information associated with the user does meet the compliance criteria associated with the outlier access permission, the system authorizes the user for the outlier access permission, as shown in block 610. This authorization may be performed automatically without manual intervention or approval, because the system has already determined that the user does not raise any compliance concerns. As noted above, the user's authorization for the outlier access permission may be time-based, number-based, or frequency-based to limit the scope of authorization by the system.

Alternatively, when the compliance information associated with the user does not meet the compliance criteria associated with the outlier access permission, the system rejects the user for the outlier access permission, as shown in block 612. In such embodiments, the system may require additional authorization credentials from the user and/or a manager or other specialist before authorizing the user for the outlier access permission. For example, the system may automatically request an authentication credential (e.g., password, reference number, approval code, or the like) from the user and/or from the specialist. If the system receives an approved authentication credential, then the system may automatically authorize the user for the outlier access permission.

In some embodiments, the system may include an impact analysis system that provides a dynamic display that allows a specialist to dynamically manipulate compliance parameters and immediately view the effects of such manipulations. For example, the system may provide a user interface on a computing device of a specialist with a display of a current compliance status associated with at least the user and adjustable compliance parameters associated with the compliance criteria. This user interface may be the user interface 330 of the computing device system 300 referenced in FIGS. 1 and 3. As noted above, the compliance criteria, or compliance requirements, are normally set by a regulatory body, the managing entity for business purposes, or by other legal or business requirements. However, these compliance criteria can change over time so it is beneficial for a business entity to test possible compliance criteria changes prior to those changes going into effect.

To test a potential change, the system may receive an adjustment to a first compliance parameter from the computing device of the specialist. For example, the first compliance parameter may be a requirement that employees with only a certain level of business experience (e.g., one year, five years, or the like) can be authorized to access a particular database. The adjustment to this first compliance parameter may be to extend the certain level of business experience to a higher level of business experience.

In response to receiving the adjustment to the first compliance parameter, the system may determine a change to the compliance criteria associated with the set of access permissions associated with the user. Continuing with the above example, the change to the compliance criteria may be that a particular user would no longer be authorized for the access permission associated with the particular database.

Finally, the system may update the display of the current compliance status on the user interface of the computing device of the specialist with the determined change to the compliance criteria associated with the set of access permissions associated with the user. In some embodiments, the system may further determine that a set of access permissions associated with the job role should be adjusted to accommodate the compliance criteria change. For example, if the user referenced above would no longer be authorized for the access permission associated with the particular database, and that access permission is part of the set of access permissions associated with the job role of the user, then the system may remove the access permission for that particular database from the set of access permissions associated with the job role of the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamic role-based evaluation of access permissions, the system comprising:
   a memory device; and
   a processing device operatively coupled to the memory device, wherein the processing device is configured to execute computer-readable program code to:
      generate a database of a plurality of known job roles and associated access permissions;
      identify a job role of a user, wherein the job role of the user is one of the plurality of known job roles, and wherein identifying the job role of the user comprises:
         compiling a business language correlation database of known job roles and associated business language terms;
         receiving, from a computing device of a specialist, a plain language job description for the user; and
         comparing the plain language job description for the user to the business language correlation database using a business language machine learning engine to identify the job role of the user;
      match the job role of the user with a set of access permissions, based on a comparison of the job role of the user to the database of the plurality of known job roles and associated access permissions;
      compare current authorized access permissions of the user to the set of access permissions associated with the job role of the user;
      identify an outlier access permission of the user that is not in the set of access permissions associated with the job role of the user;
      identify one or more other users that are associated with the job role of the user;
      identify an outlier ratio of a number of the one or more other users that are authorized for the outlier access permission of the user versus a total number of the one or more other users that are associated with the job role of the user;
      determine whether the outlier ratio is greater than a predetermined threshold ratio; and
      authorize the user for the outlier access permission in response to determining that the outlier ratio is greater than the predetermined threshold ratio; or
      do not authorize the user for the outlier access permission in response to determining that the outlier ratio is not greater than the predetermined threshold ratio.

2. The system of claim 1, wherein the processing device is further configured to execute the computer-readable program code to:
   authorize the user for the set of access permissions; and
   do not authorize the user for any other access permissions.

3. The system of claim 1, wherein the processing device is further configured to execute the computer-readable program code to:
   identify differences between current authorized access permissions of the user and the set of access permissions associated with the job role of the user;
   compile a report on the identified differences between the current authorized access permissions of the user and the set of access permissions associated with the job role of the user; and
   transmit the compiled report to a computing device of a specialist.

4. The system of claim 1, wherein the processing device is further configured to execute the computer-readable program code to:
   provide a user interface on a computing device of a specialist with a display of a current compliance status associated with at least the user and adjustable compliance parameters associated with compliance criteria;
   receive an adjustment to a first compliance parameter from the computing device of the specialist;
   in response to receiving the adjustment to the first compliance parameter, determine a change to the compliance criteria associated with the set of access permissions associated with the user; and
   update the display of the current compliance status on the user interface of the computing device of the specialist with the determined change to the compliance criteria associated with the set of access permissions associated with the user.

5. A computer program product for dynamic role-based evaluation of access permissions, the computer program product comprising at least one non-transitory computer readable medium comprising computer readable instructions, the instructions comprising instructions for:
   generating a database of a plurality of known job roles and associated access permissions;
   identifying a job role of a user, wherein the job role of the user is one of the plurality of known job roles, and wherein identifying the job role of the user comprises:
      compiling a business language correlation database of known job roles and associated business language terms;

receiving, from a computing device of a specialist, a plain language job description for the user; and comparing the plain language job description for the user to the business language correlation database using a business language machine learning engine to identify the job role of the user;

matching the job role of the user with a set of access permissions, based on a comparison of the job role of the user to the database of known job roles and associated access permissions;

comparing current authorized access permissions of the user to the set of access permissions associated with the job role of the user;

identifying an outlier access permission of the user that is not in the set of access permissions associated with the job role of the user;

identifying one or more other users that are associated with the job role of the user;

identifying an outlier ratio of a number of the one or more other users that are authorized for the outlier access permission of the user versus a total number of the one or more other users that are associated with the job role of the user;

determining whether the outlier ratio is greater than a predetermined threshold ratio; and authorizing the user for the outlier access permission in response to determining that the outlier ratio is greater than the predetermined threshold ratio; or not authorizing the user for the outlier access permission in response to determining that the outlier ratio is not greater than the predetermined threshold ratio.

6. The computer program product of claim 5, wherein the computer readable instructions further comprise instructions for:

authorizing the user for the set of access permissions; and
not authorizing the user for any other access permissions.

7. The computer program product of claim 5, wherein the computer readable instructions further comprise instructions for:

identifying differences between current authorized access permissions of the user and the set of access permissions associated with the job role of the user;

compiling a report on the identified differences between the current authorized access permissions of the user and the set of access permissions associated with the job role of the user; and transmitting the compiled report to a computing device of a specialist.

8. The computer program product of claim 5, wherein the computer readable instructions further comprise instructions for:

providing a user interface on a computing device of a specialist with a display of a current compliance status associated with at least the user and adjustable compliance parameters associated with compliance criteria;

receiving an adjustment to a first compliance parameter from the computing device of the specialist;

in response to receiving the adjustment to the first compliance parameter, determining a change to the compliance criteria associated with the set of access permissions associated with the user; and updating the display of the current compliance status on the user interface of the computing device of the specialist with the determined change to the compliance criteria associated with the set of access permissions associated with the user.

9. A computer implemented method for dynamic role-based evaluation of access permissions, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating a database of a plurality of known job roles and associated access permissions;

identifying a job role of a user, wherein the job role of the user is one of the plurality of known job roles, and wherein identifying the job role of the user comprises:

compiling a business language correlation database of known job roles and associated business language terms;

receiving, from a computing device of a specialist, a plain language job description for the user; and comparing the plain language job description for the user to the business language correlation database using a business language machine learning engine to identify the job role of the user;

matching the job role of the user with a set of access permissions, based on a comparison of the job role of the user to the database of the plurality of known job roles and associated access permissions;

comparing current authorized access permissions of the user to the set of access permissions associated with the job role of the user;

identifying an outlier access permission of the user that is not in the set of access permissions associated with the job role of the user;

identifying one or more other users that are associated with the job role of the user;

identifying an outlier ratio of a number of the one or more other users that are authorized for the outlier access permission of the user versus a total number of the one or more other users that are associated with the job role of the user;

determining whether the outlier ratio is greater than a predetermined threshold ratio; and authorizing the user for the outlier access permission in response to determining that the outlier ratio is greater than the predetermined threshold ratio; or not authorizing the user for the outlier access permission in response to determining that the outlier ratio is not greater than the predetermined threshold ratio.

10. The computer implemented method of claim 9, further comprising:

authorizing the user for the set of access permissions; and
not authorizing the user for any other access permissions.

11. The computer implemented method of claim 9, further comprising:

identifying differences between current authorized access permissions of the user and the set of access permissions associated with the job role of the user;

compiling a report on the identified differences between the current authorized access permissions of the user and the set of access permissions associated with the job role of the user; and transmitting the compiled report to a computing device of a specialist.

12. The computer implemented method of claim 9, further comprising:

providing a user interface on a computing device of a specialist with a display of a current compliance status associated with at least the user and adjustable compliance parameters associated with compliance criteria;

receiving an adjustment to a first compliance parameter from the computing device of the specialist;

in response to receiving the adjustment to the first compliance parameter, determining a change to the compliance criteria associated with the set of access permissions associated with the user; and updating the display of the current compliance status on the user interface of the computing device of the specialist with the determined change to the compliance criteria associated with the set of access permissions associated with the user.

* * * * *